No. 696,473. Patented Apr. 1, 1902.
F. C. NEWELL.
AUTOMATIC REGULATOR FOR ELECTRIC CIRCUITS.
(Application filed Apr. 28, 1900.)
(No Model.)
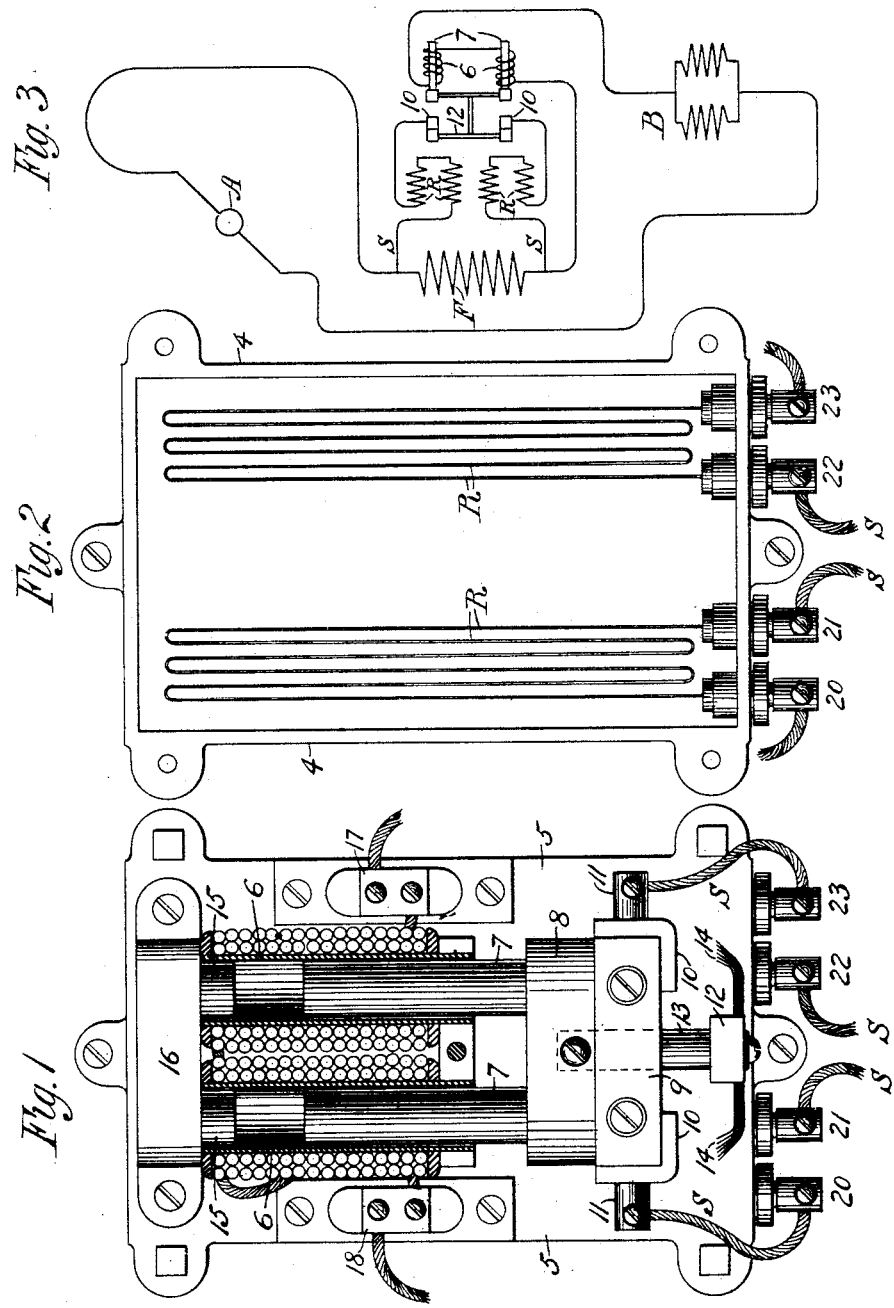
WITNESSES:
INVENTOR,
Frank C. Newell,
by T. J. Hogan,
Att'y.

UNITED STATES PATENT OFFICE.

FRANK C. NEWELL, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

AUTOMATIC REGULATOR FOR ELECTRIC CIRCUITS.

SPECIFICATION forming part of Letters Patent No. 696,473, dated April 1, 1902.

Application filed April 28, 1900. Serial No. 14,687. (No model.)

*To all whom it may concern:*

Be it known that I, FRANK C. NEWELL, a citizen of the United States, residing at Wilkinsburg, county of Allegheny, State of Pennsylvania, have invented or discovered a certain new and useful Improvement in Automatic Regulators for Electric Circuits, of which improvement the following is a specification.

My invention relates to automatic regulators for electric circuits; and its object is to provide an improved regulator which is adapted to be inserted in a generator-circuit and arranged to shunt a part of the current around the field of the generator when the strength of the current reaches or exceeds a certain point.

The invention consists in a shunt-circuit with its ends connected to opposite sides of the field of the generator and a solenoid in the generator-circuit adapted to open or close the shunt-circuit, according to the strength of the current in the generator-circuit.

The invention also consists in certain combinations and arrangement of parts, as hereinafter described, and set forth in the claims.

In the accompanying drawings, which form a part of this specification, Figure 1 represents a front elevation and partial section of the regulator. Fig. 2 is a view of the interior of the casing of the regulator, showing the coils of the shunt-circuit, the cover of the casing carrying the solenoids being removed. Fig. 3 is a diagrammatic view showing the regulator applied to an electric braking-circuit for cars.

The regulator is constructed with a casing 4, having a cover 5, on which are carried the solenoids 6. In this instance I have shown a compound solenoid having two movable cores 7 7, connected at their outer ends by a cross piece or head 8, although a single solenoid may be used.

9 represents a projection on the cover of the casing and composed of non-conducting material. This projection carries the metallic contact-surfaces 10 10, connected to the binding-posts 11 11, to which are attached the wires of the shunt-circuit S. The head 8 of the solenoid-cores is connected to the switch 12 by a rod 13, of insulating material, which slides through an opening in the projection 9. The switch 12 is provided with contact-points 14, made up of a series of flexible and elastic laminations, whereby a yielding and elastic contact is secured when the shunt-circuit is closed and the points 14 make contact with the plates or surfaces 10.

The solenoids 6 are provided at their inner ends with short stationary cores 15 15, connected by the head 16, and the cores are of such lengths that a short air-space is provided between the ends of the stationary cores and the ends of the movable cores when the latter are drawn inward to the full extent of their movement. The main circuit is connected at points 17 and 18, so that the current of the main circuit passes through the coils. The casing is also provided with binding-posts 20, 21, 22, and 23, by means of which the coils R R are connected into the shunt-circuit S.

In Fig. 3 is shown diagrammatically the application of the regulator to the braking-circuit of a car. A indicates the armature, F the field of the generator, and B the magnetic brake device located in the circuit. This circuit from the generator also passes through the coils 6 of the solenoids.

The ends of the shunt-circuit S are connected to the braking-circuit on opposite sides of the field, and the switch 12 is operated by the solenoids to make and break the shunt-circuit at the points 10 10.

In the use of the motor as a generator for supplying a braking-circuit on a car it has been found that there is often too much current generated for the proper application of the brake, and various resistance devices have been devised for restricting the current to the brake-magnets. My improvement has the advantage that the regulator instead of introducing resistance into the circuit shunts a part of the current around the field of the generator, and thus prevents the generation of an excessively strong current.

As shown in Fig. 1, the regulator is placed in a vertical position, and the movable cores 7, with the head 8, normally occupy their lower or outermost position by gravity. In this position the head 8 rests against the projection 9, of insulating material, and the shunt-circuit is broken. The vertical position of the solenoids is preferred; but the device will also operate in other positions, in which case any ordinary means, such as a light spring, may be provided to normally keep the switch open. When the strength of the current passing through the coils of the solenoids is sufficient to overcome the weight of the switch with the head and movable cores, the cores are drawn up and the switch assumes its closed position, with contact-points 14 bearing against the plates 10. The shunt-circuit is now closed, and consequently less current from the armature passes through the field of the generator. Consequently the strength of the braking-current is reduced until it is somewhat below the point at which the device is set to operate. Then the head falls and the shunt-circuit is broken. The weight of the moving parts is properly proportioned so that the regulator will operate positively at a certain strength of current, and by the arrangement of the stationary cores and the spaces between the ends of the stationary and movable cores the switch may be held closed until the strength of the current has been reduced a certain number of amperes below that at which the regulator is set to act. This may be varied by varying the length of the spaces between the ends of the stationary and movable cores of the solenoid. It will thus be seen that the regulator automatically limits the strength of the current generated and prevents it from becoming so high as to interfere with the proper operation of the brake-magnets.

Having now described my invention, what I desire to claim and secure by Letters Patent is—

1. An automatic regulator for electric circuits, comprising a normally open shunt-circuit, two contact-plates for the shunt-circuit, a solenoid having a movable core, and a rod operated by said core and carrying two contact-points adapted to close the shunt-circuit when an excessive current passes through the solenoid.

2. An automatic regulator for electric circuits, comprising a normally open shunt-circuit, a resistance-coil in the shunt-circuit, a spacing-block of insulating material, two contact-plates for the shunt-circuit secured to the block, a solenoid, a movable core therefor provided with a rod carrying two contact-points at its outer end adapted to close the shunt-circuit when an excessive current passes through the solenoid.

3. An automatic regulator for electric circuits, comprising a normally open shunt-circuit having a resistance-coil, a block of insulating material, two contact-plates for the shunt-circuit spaced apart upon the insulating-block, a solenoid having a movable core provided with a head which is adapted to rest against the insulating-block when the switch is in its open position, and a switch connected to said head and having two contact-points for closing the shunt-circuit.

4. An automatic regulator for electric circuits, comprising a casing, a normally open shunt-circuit having a resistance-coil in the casing, a solenoid carried by the casing and having a movable core provided with a head, a block of insulating material secured to the casing, two contact-plates for the shunt-circuit carried by the insulating-block and a switch connected to said head and having two contact-points for closing the shunt-circuit when an excessive current passes through the solenoid.

5. An automatic regulator for electric circuits, comprising a casing, a shunt-circuit having resistance-coils in the casing, a solenoid mounted in a vertical position on the casing, a stop secured to the casing and adapted to support the movable core of the solenoid when the shunt-circuit is open and a switch in the shunt-circuit operated by the solenoid.

6. In an electric system, a generator, a generator-circuit, a shunt-circuit around the field of the generator, said shunt-circuit being normally open, a solenoid in the generator-circuit, two contact-plates in the shunt-circuit, a rod connected to the movable core of the solenoid and carrying two contact-points adapted to close the shunt-circuit when the current in the generator-circuit is excessive.

7. In an electric system, a generator, a generator-circuit, a shunt-circuit around the field of the generator, a solenoid in the generator-circuit, a movable core for the solenoid, a stop for supporting the movable core in its outer position when the shunt-circuit is open and a switch in the shunt-circuit operated by the solenoid.

In testimony whereof I have hereunto set my hand.

FRANK C. NEWELL.

Witnesses:
R. F. EMERY,
JAS. B. MACDONALD.